Aug. 30, 1932.  E. V. TAYLOR  1,874,499
BRAKE.
Filed Dec. 3, 1928
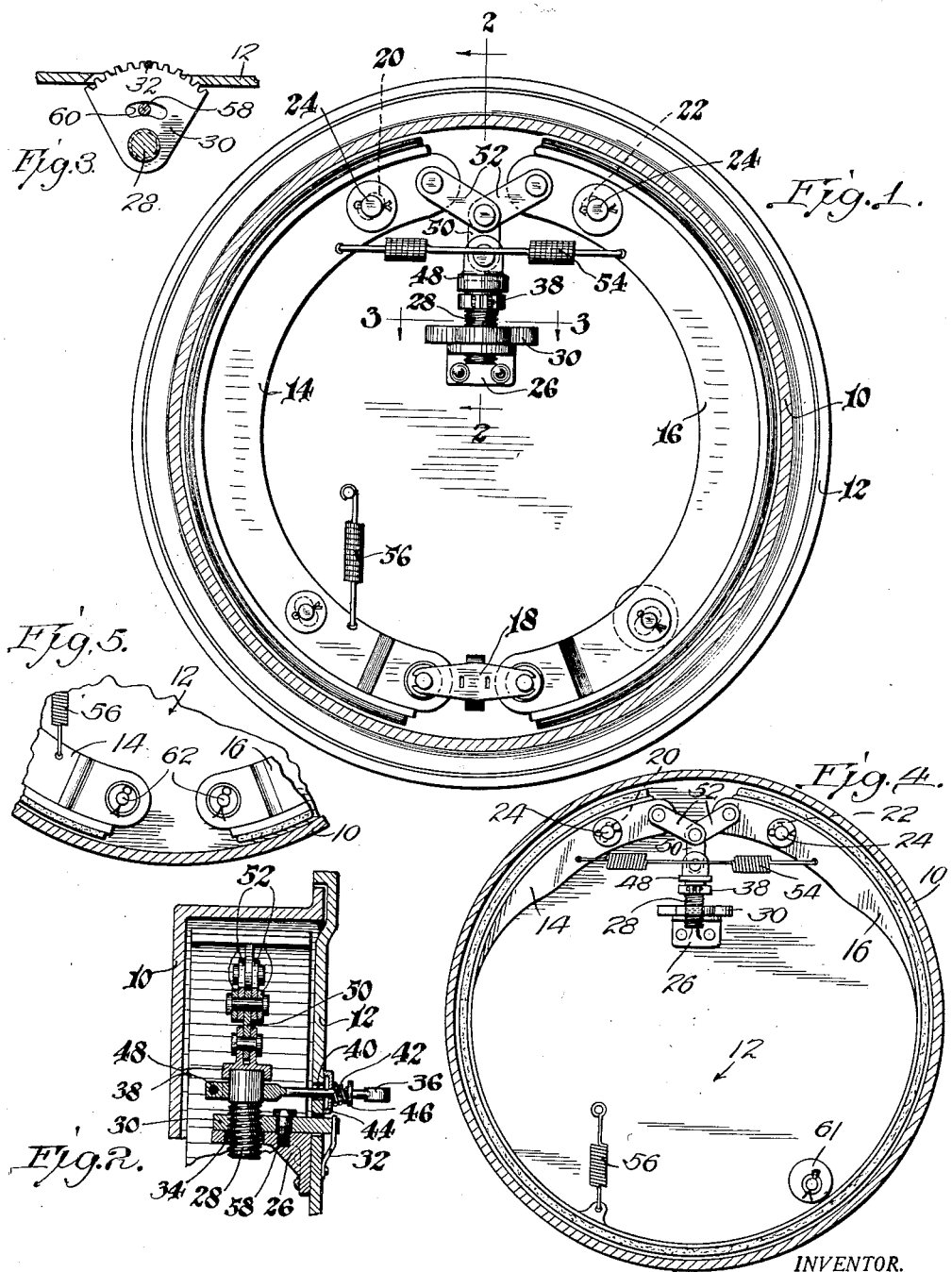
INVENTOR.
Eugene V. Taylor
BY H. O. Clayton
ATTORNEY Patented Aug. 30, 1932

1,874,499

UNITED STATES PATENT OFFICE

EUGENE V. TAYLOR, OF CHICAGO, ILLINOIS, ASSIGNOR TO BENDIX BRAKE COMPANY, OF SOUTH BEND, INDIANA, A CORPORATION OF ILLINOIS

BRAKE

Application filed December 3, 1928. Serial No. 323,249.

My invention relates to improvements in brake mechanism and is illustrated as embodied in an internal brake mechanism particularly adapted for use on a motor vehicle.

An object of the invention is to provide a simple and effective combined operating and adjusting mechanism for the brake shoes or equivalent friction means and in that embodiment of my invention illustrated in the drawing I have provided a pair of pivotally connected floating brake shoes actuated by my novel adjustable and radially extending screw plunger.

A further feature of my invention relates to the particular arrangement of the combined operating and adjusting means, together with a novel floating toggle or equivalent linkage connecting the same to the shoes and wherein both actuation and clearance adjustment of the shoes may be effected without affecting the anchorage of the brake. It is also to be noted that the lining clearance adjustment of the shoes or other friction medium may be effected through a portion of the actuating means, the elements constituting both the adjusting and actuating means being interdependent.

Other advantages and meritorious features of my improved construction will appear from the following specification, appended claims and accompanying drawing, wherein:

Figure 1 is a vertical sectional view through a brake drum showing the brake shoes and combined applying and adjusting means in elevation;

Figure 2 is a partial radial sectional view through the combined applying and adjusting means taken on the line 2—2 of Figure 1;

Figure 3 is a view taken on the line 3—3 of Figure 1 disclosing the novel adjusting sector in detail.

Figure 4 is a vertical sectional view similar to Fig. 1, showing the combined applying and adjusting means associated with a continuous band type of friction means; and Figure 5 is a partial vertical sectional view of a rigidly anchored type of friction means.

In that embodiment of my invention illustrated in the drawing 10 indicates the usual brake drum closed by a cover or backing plate 12, the latter supporting my novel brake mechanism. I preferably provide two floating brake shoes 14 and 16 pivotally articulated as at 18 and slotted as at 20 and 22 at their spaced apart ends to accommodate anchor posts 24 rigidly secured to the backing plate. It is to be appreciated, however, that other types of floating friction means such as a continuous band might be substituted in lieu of the two shoes disclosed.

According to an important feature of my invention, I provide a novel combined adjusting and actuating mechanism for the friction means of the brake comprising an angle bracket 26 rigidly secured to the backing plate 12, which bracket is arranged to support my novel mechanism. A vertically arranged screw 28 is preferably threaded into a sector 30, the latter lying flat upon the outer face of the aforementioned bracket and notched at its arc edge to accommodate a spring clip 32. Screw 28 passes through an opening 34 in the bracket and is adapted to be rotated by a lever member 36 frictionally secured thereto by a split boss end 38. Lever 36 passes through a suitably shaped slot 40 in the backing plate and lateral movement thereof is obviated by a compression spring 42 confined between a plate contacting sleeve 44 and a stop 46 on the lever.

A further feature of my invention involves the provision of novel linkage co-operating with the radially movable plunger screw and comprises a cup-shaped cap member 48 fitting over one end of the screw and pivotally connected to a thrust link 50. Link 50 is in turn pivotally connected to the inclined links 52, each pivoted to the ends of the friction means, the whole constituting in effect a toggle applying means.

In operation, movement of the lever 36, by a suitable transmission to the service pedal, effects, against the action of return springs 54 and 56, a radial movement of the screw to actuate, through the intermediary of the toggle links, the retarding means of the brake. Adjustment of the brake to compensate for lining wear may be effected through movement of the sector 30 to alter the relative position of the actuating screw, the adjusted position of the sector being retained by the clip 32 supplemented by the set screw 58, the latter threaded in the bracket and passed through an arcuate slot 60 in the sector.

It will be noted that with my novel brake structure anchoring of the friction means on one or the other of the anchor posts 24 is unaffected by either the applying or the adjusting means connected thereto; that common elements constitute the adjusting and applying structure; that the adjustment of the brake may be effected without disturbing the applying function of the aforementioned elements; and lastly that my novel mechanism may be associated with either the floating or rigidly anchored type of friction means.

While but one embodiment of my invention has been disclosed and described in detail, it is not my intention to unnecessarily limit the invention thereto but only as far as may be defined by the scope of the appended claims.

I claim:

1. A brake comprising, in combination, a drum, a plurality of connected shoes within the drum, the adjacent unconnected ends of the shoes being formed with slots, an anchor member passing through each of said slots and a screw actuated toggle arranged within the shoes and connected to said ends, said toggle being so mounted as to permit the shifting of the shoes to selectively anchor on either one of said anchor members.

2. A brake comprising, in combination, a rotatable drum, a brake support plate, a bracket support on said plate, expansible friction means within the drum and means operable to expand the friction means comprising a toggle actuated by a radially movable plunger having a screw-threaded engagement with said bracket.

3. Operating mechanism for a brake comprising a screw-actuated toggle, said screw being rotated by a lever extending substantially normal to the line of the screw.

4. Operating mechanism for a brake of the internal expanding type comprising, in combination, a floating toggle linkage and means operable to actuate said toggle including a radially movable screw engaging said linkage.

5. Operating mechanism for a brake of the internal expanding type comprising, in combination, a floating toggle and means operable to actuate said toggle linkage including a radially movable screw engaging said linkage, together with a lever member extending normally to said screw and constructed and arranged to actuate the same.

6. Brake operating and adjusting mechanism including a screw member and an adjusting sector extending substantially normal thereto, said member having a threaded engagement with said sector member.

7. A brake structure comprising, in combination, a retarding friction device and a support member therefor, operating and adjusting means for said device comprising a sector member secured to said support and a screw member threadedly engaging said sector.

8. Operating and adjusting mechanism for a brake comprising, in combination, an adjusting sector having an internally threaded opening in one end thereof and an operating screw member threaded into said opening.

9. A brake structure comprising, in combination, a shiftable floating friction device anchoring on either one of spaced apart ends and means including a screw functioning both as an applying member for said device and as an adjusting member therefor so constructed and arranged as to be unaffected by the shifting of the floating device.

10. In a brake structure, a combined applying and adjusting mechanism comprising two interdependent screw-threaded parts extending at right angles to each other.

In testimony whereof, I have hereunto signed my name.

EUGENE V. TAYLOR.